Nov. 17, 1964   J. D. HEIDE   3,157,331
ROLLER DEVICE
Filed Dec. 4, 1962
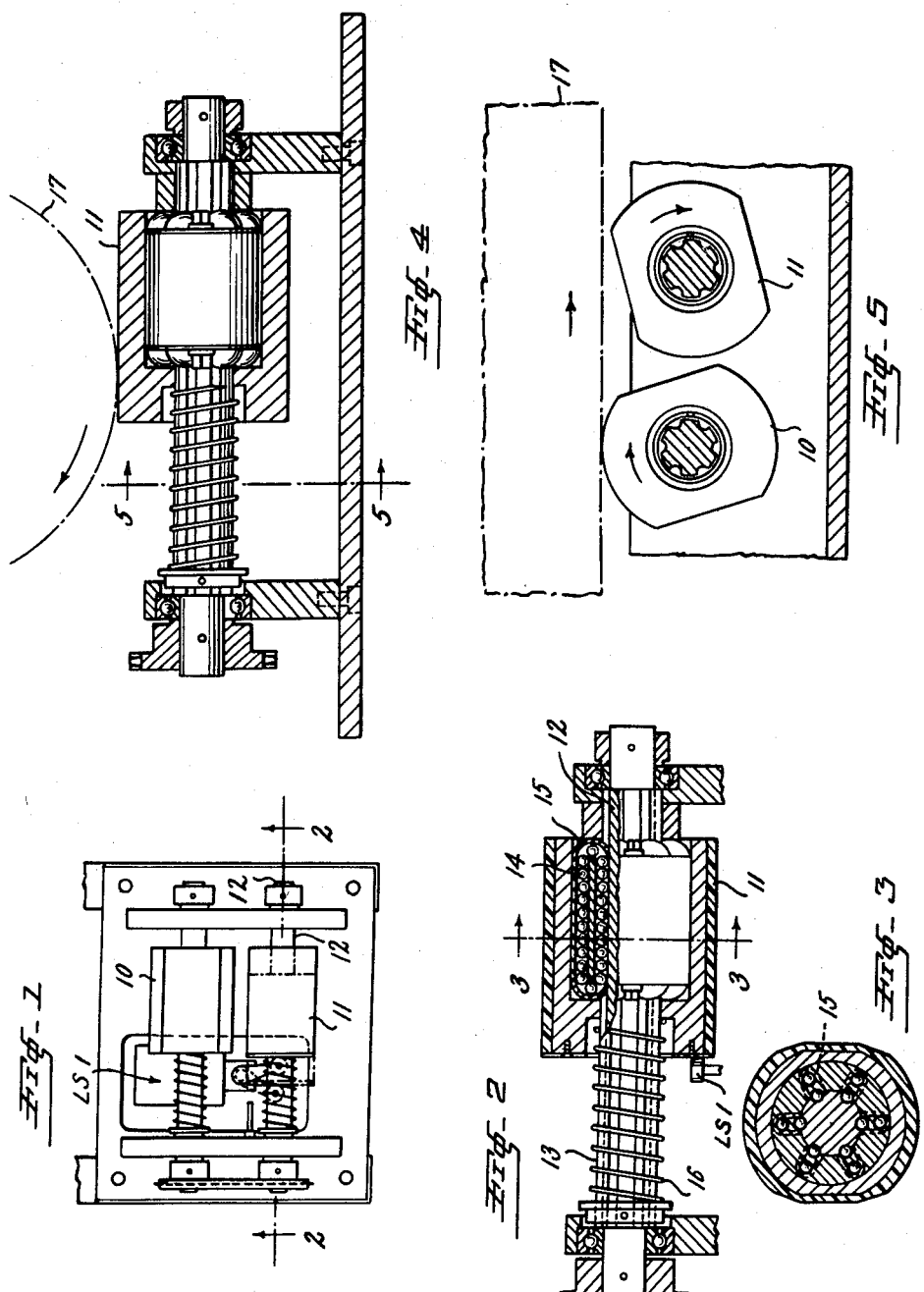
INVENTOR
JOHN D. HEIDE
BY
Charles A. Blank
ATTORNEY

United States Patent Office 3,157,331
Patented Nov. 17, 1964

3,157,331
ROLLER DEVICE
John D. Heide, Ramsey, N.J., assignor to United States Rubber Company, New York, N.Y., a corporation of New Jersey
Filed Dec. 4, 1962, Ser. No. 242,289
4 Claims. (Cl. 226—100)

This invention relates to roller devices, and, more particularly, to roller devices for transporting a rotating generally cylindrical object axially.

It is an object of the invention to provide a new and improved roller device capable of supporting a rotating cylinder and maintaining a continuous rolling contact therewith while transporting the cylinder axially.

In accordance with a particular form of the invention, a device for axially transporting a rotatable generally cylindrical object comprises a plurality of rollers intercoupled in sets rotatable in the direction of axial transport of the object. Each roller has an axis of rotation transverse to the direction of axial transport and has a substantially cylindrical surface portion of a given radius and a depressed surface portion. The rollers are intercoupled in such manner that at all times the cylindrical surface portion of at least one roller in each set is in supporting contact with the rotatable object and the cylindrical surface portion of each roller is out of contact with the object during a portion of each revolution of each roller. The rollers are mounted reciprocably on their respective axes.

For a better understanding of the present invention together with other and further objects thereof, reference is made to the following description, taken in connection with the accompanying drawings, and its scope will be pointed out in the appended claims.

Referring to the drawings:

FIG. 1 is a fragmentary plan view, of a set of rollers constructed in accordance with the invention;

FIG. 2 is a view, in section, taken along line 2—2 of FIG. 1;

FIG. 3 is a view, in section, of a roller, taken along line 3—3 of FIG. 2;

FIG. 4 is an enlarged view in section of a roller device to indicate its operation while transporting a cylindrical object axially; and FIG. 5 is a view in section taken along line 5—5 of FIG. 4.

Referring now more particularly to FIGS. 1, 2 and 3, the roller device there represented includes a plurality of slidable rollers 10, 11 and may also include a limit switch LS1 actuated by the roller 11 when the roller is displaced transversely of the generally cylindrical object being transported. The roller 11 is represented partially in section in FIG. 2 and also in section in FIG. 3. The roller 11 is suitably covered with a soft high friction material, for example, rubber or polyurethane, and is mounted on a transverse axial shaft 12 having grooves 13 therein for receiving balls 14 from races 15 of the rollers. A suitable spring 16 maintains the roller normally in the position represented in the drawing so that switch LS1 is normally unactuated.

Referring to FIGS. 4 and 5, when a rotating cylindrical object, for example, a tire building drum 17, travels over the roller 11, the roller slides along the shaft 12 to actuate the switch LS1. The switch may be coupled in a suitable electrical circuit, for example, in series with a battery light to signal the displacement of the roller and thus to signal rotation of the object being transported.

The rollers 10 and 11 are coupled by means of a suitable drive belt with a substantially cylindrical surface portion on one roller in contact with the cylindrical object while a depressed surface portion of the other roller does not contact the object, allowing the latter roller to return to its normal position. The rollers are intercoupled in such manner that at all times the cylindrical surface portion of at least one roller in each set is in supporting contact with the rotatable object and the cylindrical surface portion of each roller is out of contact with the object during each revolution of the roller. As indicated in FIGS. 4 and 5, the rollers preferably are flattened on opposite sides and preferably are rotated 90° with respect to each other so that the drum is always supported by one roller while the other roller returns to its rest position.

It will be understood that the rollers are effective to transport a cylindrical object in a direction substantially normal to the axis of the rollers regardless of whether the cylindrical object is rotating during the motion. The rollers may be driven rotationally by a suitable belt (not shown) or may rotate in response to the forward motion of the object being transported which may be driven by other means.

While there has been described what is at present believed to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. A device for axially transporting a rotatable generally cylindrical object comprising: a plurality of rollers intercoupled in sets rotatable in the direction of axial transport of the object, each roller having an axis of rotation transverse to the said direction of axial transport and having a substantially cylindrical surface portion of a given radius and a depressed surface portion, said rollers being intercoupled in such manner that at all times said cylindrical surface portion of at least one roller in each set is in supporting contact with said rotatable object and the cylindrical surface portion of each roller is out of contact with said object during a portion of each revolution of each roller, said rollers being mounted reciprocably on their respective axes.

2. The device of claim 1 wherein each roller has two cylindrical surface portions symmetrically disposed about its axis.

3. A device for axially transporting a rotatable generally cylindrical object comprising: a plurality of substantially identical rollers rotatable in the direction of axial transport of the object, each roller having an axis of rotation transverse to the said direction of axial transport and having opposite substantially cylindrical surface portions of a given radius joined by flattened, depressed surface portions, said rollers being intercoupled with a 90° relative rotational displacement in such manner that at all times the cylindrical surface portion of at least one roller in each set is in supporting contact with said rotatable object and the cylindrical surface portion of each roller is out of contact with said object during a portion of each revolution of each roller, said rollers being mounted for transverse displacement upon rotation of the object being transported, and springs for returning each roller to a predetermined transverse position in the absence of contact with the object being transported.

4. A device for axially transporting a rotatable generally cylindrical object comprising: a plurality of rollers intercoupled in sets rotatable in the direction of axial transport of the object, each roller having an axis of rotation transverse to said direction of axial transport and having a substantially cylindrical arcuate surface portion of a given radius and a depressed surface portion, said rollers being intercoupled in such manner that at all times said cylindrical surface portion of at least one roller in each set is in supporting contact with said rotatable object and the cylindrical portion of each roller is out of contact with said object during a portion of each revolution of each roller, said rollers being mounted for transverse displacement upon rotation of the object being transported, and means responsive to the transverse displacement of a roller for indicating rotation of the object being transported.

References Cited in the file of this patent

UNITED STATES PATENTS

| | | |
|---|---|---|
| 2,344,586 | Barrans | Mar. 21, 1944 |
| 2,795,320 | Dillingham | June 11, 1957 |
| 3,052,393 | McKenzie | Sept. 4, 1962 |

FOREIGN PATENTS

| | | |
|---|---|---|
| 290,469 | Switzerland | Aug. 1, 1953 |